(No Model.)
R. C. TIGNER.
ANIMAL POKE.
No. 245,241. Patented Aug. 2, 1881.
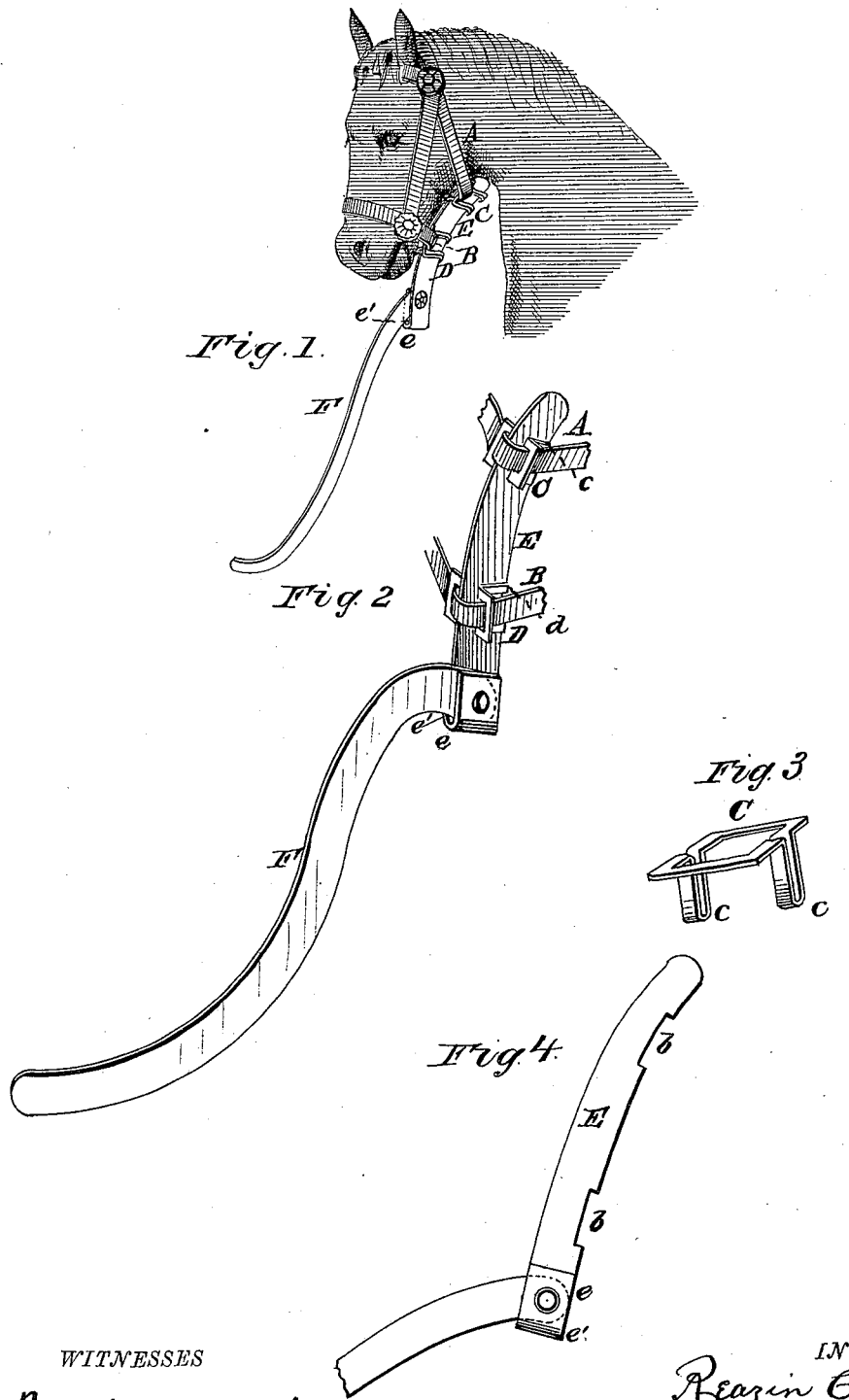
WITNESSES
INVENTOR
By his Attorney

UNITED STATES PATENT OFFICE.

REAZIN C. TIGNER, OF RICHMOND, INDIANA.

ANIMAL-POKE.

SPECIFICATION forming part of Letters Patent No. 245,241, dated August 2, 1881.

Application filed June 1, 1881. (No model.)

*To all whom it may concern:*

Be it known that I, REAZIN CLARK TIGNER, a citizen of the United States, residing at Richmond, in the county of Wayne and State of Indiana, have invented certain new and useful Improvements in Animal-Pokes; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification, and in which—

Figure 1 represents the head of a horse with my improved poke applied thereto. Fig. 2 represents my improved poke as applied to a halter. Figs. 3 and 4 represent detail views.

My invention relates to certain new and useful improvements in the class of animal-pokes more especially designed for use in connection with halters, to prevent horses and other animals from jumping and throwing down fences and gates or bars; and to this end the invention consists in novel features of construction and combination and arrangement of parts, all as will be hereinafter fully described, and specifically pointed out in the claims.

In the drawings, A represents the throat-strap, and B the chin-strap, of the usual head-halter, and which are respectively provided with metallic loops or keepers C D, for the reception of the short metallic arm E of the poke. These loops or keepers C and D have their central portions, $c$ and $d$, bent or turned up at right-angles to the main portions thereof, forming clasps which embrace the arm E and rest in notches or grooves $b\ b$ on the under side of said arm, thus holding said loops or keepers in position, and also firmly securing said arm to the halter and under and between the jaws of the animal, all as clearly shown in Fig. 1.

The front or forward end, $e$, of the short arm E is bent or turned parallel with the main portion thereof, and between which is pivoted the long arm F of the poke, and which is held in proper position, when not on the ground, by resting on the concave inner face, $e'$, formed by the bend in said turned-up portion $e$. The long arm F, being pivoted as shown, permits the animal to put his head to the ground to feed or graze, and the forward end of said arm is slightly turned up, as shown, to keep it from catching in the ground, and to slide easily over the ground in front of the animal when his head is down in position to feed or graze.

My improved poke, being adapted to the common head-halter for animals, will not chafe or produce any ill-effects on the animal, and the loops or keepers being on the halter, it is only necessary to slip the short arm through said loops or keepers until they rest in the notches or grooves on the under side of said arm, when by adjusting the straps F and G the arm will be firmly secured in position.

Having thus fully described my invention, what I claim as new, and desire to secure by Letters Patent, is—

1. The combination, with the head-halter, of the poke composed of the short and long arms E F, pivoted together as shown, and the metallic loops or keepers C D, substantially as and for the purpose specified.

2. The combination, with the head-halter, of the metallic loops or keepers C and D, having the turned-up portions $c$ and $d$, and the short arm E of the poke, having notches or grooves on its under side, substantially as and for the purpose herein shown and described.

In testimony whereof I affix my signature in presence of two witnesses.

REAZIN CLARK TIGNER.

Witnesses:
CHARLES KEYS,
JOHN ELLIOTT.